United States Patent
Ishigooka et al.

(10) Patent No.: US 12,534,032 B2
(45) Date of Patent: Jan. 27, 2026

(54) VEHICLE CONTROL DEVICE

(71) Applicant: HITACHI ASTEMO, LTD., Hitachinaka (JP)

(72) Inventors: Tasuku Ishigooka, Tokyo (JP); Kazuyoshi Serizawa, Hitachinaka (JP); Takashi Murakami, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 226 days.

(21) Appl. No.: 18/252,974

(22) PCT Filed: Aug. 31, 2021

(86) PCT No.: PCT/JP2021/031889
§ 371 (c)(1),
(2) Date: May 15, 2023

(87) PCT Pub. No.: WO2022/137651
PCT Pub. Date: Jun. 30, 2022

(65) Prior Publication Data
US 2023/0415677 A1 Dec. 28, 2023

(30) Foreign Application Priority Data
Dec. 21, 2020 (JP) .................................. 2020-211436

(51) Int. Cl.
*B60R 16/023* (2006.01)
*G06F 9/48* (2006.01)

(52) U.S. Cl.
CPC ........ *B60R 16/0232* (2013.01); *G06F 9/4856* (2013.01)

(58) Field of Classification Search
CPC ............. B60R 16/0232; G06F 11/0739; G06F 11/0757; G06F 11/2035; G06F 9/4856;
(Continued)

(56) References Cited

U.S. PATENT DOCUMENTS 8,032,891 B2 * 10/2011 Chauvel ................ G06F 1/3228
718/107
8,452,465 B1 * 5/2013 Sinha .................... G06F 11/143
365/189.08

(Continued)

FOREIGN PATENT DOCUMENTS

CN 109002368 A * 12/2018 ............ G06F 11/076
EP 3813307 A1 * 4/2021 ............ H04L 12/40
(Continued)

OTHER PUBLICATIONS

Japanese Office Action issued in corresponding JP Application No. 2020-211436, dated Jul. 30, 2024 with English translation (8 pages).
(Continued)

Primary Examiner — Babar Sarwar
(74) Attorney, Agent, or Firm — Foley & Lardner LLP

(57) ABSTRACT

Provided is a vehicle control device capable of improving safety and availability by determining, in response to a failure of a core, a core to which the software is to be moved, determining whether there is a contention in the timings of execution based on software operations after the software is moved to another core, and making an arbitration when there is a contention. The vehicle control device has a CPU 11 that executes a plurality of tasks in clock-synchronization, the vehicle control device including a failure detecting unit 121 that detects a failure of a core 10 on the CPU 11, and an execution timing arbitration unit 124 that allocates a task having been executed by a failed core 10 to a non-failed core 10. When the task having been executed by the failed core 10 is allocated to the non-failed core 10, the execution timing arbitration unit 124 shifts the execution time slot in a manner making the task being executed by the non-failed core 10 executable, thereby setting time slots in which the plurality of tasks are executable.

12 Claims, 23 Drawing Sheets

(58) Field of Classification Search
CPC ........... B60W 50/029; B60W 50/0225; B60W 2050/0006
See application file for complete search history.

(56) References Cited

U.S. PATENT DOCUMENTS

| | | | | |
|---|---|---|---|---|
| 8,775,830 | B2* | 7/2014 | Sur | G06F 1/206 713/300 |
| 10,083,588 | B1* | 9/2018 | Kapoor | G08B 21/04 |
| 2002/0099487 | A1* | 7/2002 | Suganuma | B60R 16/0232 701/1 |
| 2006/0101465 | A1* | 5/2006 | Kato | G05B 19/0421 718/100 |
| 2009/0013217 | A1* | 1/2009 | Shibata | G06F 11/0724 714/47.1 |
| 2011/0145605 | A1* | 6/2011 | Sur | G06F 1/3287 713/300 |
| 2012/0283907 | A1* | 11/2012 | Lee | B60T 8/17557 701/32.9 |
| 2013/0253793 | A1* | 9/2013 | Lee | B60W 50/029 701/70 |
| 2018/0286142 | A1* | 10/2018 | Pakki | B64D 45/00 |
| 2019/0300007 | A1* | 10/2019 | Hilligardt | B60W 50/029 |
| 2020/0167230 | A1* | 5/2020 | Min | G06F 11/0724 |
| 2022/0306131 | A1* | 9/2022 | Rammert | B60W 10/184 |

FOREIGN PATENT DOCUMENTS

| | | | | |
|---|---|---|---|---|
| JP | 2002-221075 | A | | 8/2002 |
| JP | 2006-134203 | A | | 5/2006 |
| JP | 2012-032888 | A | | 2/2012 |
| JP | 2013-210833 | A | | 10/2013 |
| JP | 6189004 | B1 | | 8/2017 |
| JP | 2018-112977 | A | | 7/2018 |
| WO | WO-9826958 | A1 * | 6/1998 | .......... G06F 11/2035 |
| WO | WO-2018065973 | A1 * | 4/2018 | ............ G06F 21/74 |
| WO | WO-2020016622 | A1 * | 1/2020 | ............ G05D 1/246 |
| WO | WO-2021106353 | A1 * | 6/2021 | ........... G06F 9/4806 |

OTHER PUBLICATIONS

English Translation of International Preliminary Report on Patentability and Written Opinion issued in International Patent Application No. PCT/JP2021/031889 dated Jun. 29, 2023 (7 pages).
International Search Report with English Translation and Written Opinion of International Patent Application No. PCT/JP2021/031889 dated Oct. 26, 2021 (10 pages).

* cited by examiner

TASK SET INFORMATION

| CORE ID | TASK GROUP | TASK ID | PROPERTY | CYCLE | START TIME | END TIME | MARGIN |
|---|---|---|---|---|---|---|---|
| 1 | 1 | 1 | R | 10ms | 0 | 1 | 0 |
| 1 | 1 | 2 | E | 10ms | 1 | 5 | 2 |
| 1 | 1 | 3 | W | 10ms | 9 | 10 | 0 |
| 2 | 2 | 4 | R | 10ms | 0 | 1 | 0 |
| 2 | 2 | 5 | E | 10ms | 1 | 5 | 2 |
| 2 | 2 | 6 | W | 10ms | 9 | 10 | 0 |
| ... | ... | ... | ... | ... | .. | ... | ... |

TASK SET INFORMATION

| CORE ID | TASK GROUP | TASK ID | PROPERTY | CYCLE | START TIME | END TIME | MARGIN |
|---|---|---|---|---|---|---|---|
| 1 | 1 | 1 | R | 10ms | 0 | 1 | 0 |
| 1 | 1 | 2 | E | 10ms | 1 | 5⇒4 | 2⇒1 |
| 1 | 1 | 3 | W | 10ms | 9 | 10 | 0 |
| 2⇒1 | 2 | 4 | R | 10ms | 0 | 1 | 0 |
| 2⇒1 | 2 | 5 | E | 10ms | 1 | 5⇒4 | 2⇒1 |
| 2⇒1 | 2 | 6 | W | 10ms | 9 | 10 | 0 |
| ... | ... | ... | ... | ... | .. | ... | ... |

TASK SET INFORMATION

| CORE ID | TASK GROUP | TASK ID | PROPERTY | CYCLE | START TIME | END TIME | MARGIN |
|---|---|---|---|---|---|---|---|
| 1 | 1 | 1 | R | 10ms | 0 | 1 | 0 |
| 1 | 1 | 2 | E | 10ms | 1 | 4 | 2 |
| 1 | 1 | 3 | W | 10ms | 9 | 10 | 0 |
| 1 | 2 | 4 | R | 10ms | 0⇒4 | 1⇒5 | 0 |
| 1 | 2 | 5 | E | 10ms | 1⇒5 | 4⇒8 | 2 |
| 1 | 2 | 6 | W | 10ms | 9⇒8 | 10⇒9 | 0 |
| ... | ... | ... | ... | ... | .. | ... | ... |

PROCESS CONTINUITY DETERMINATION TABLE

| FUNCTION GROUP | TASK GROUP | TASK ID | PROCESS CONTINUITY | ASIL | REQUIRED CPU UTILIZATION RATE |
|---|---|---|---|---|---|
| 1 | 1 | 1 | REQUIRED | D | 20% |
| 1 | 1 | 2 | | | |
| 1 | 1 | 3 | | | |
| 2 | 2 | 4 | REQUIRED | D | 30% |
| 2 | 2 | 5 | | | |
| 2 | 2 | 6 | | | |
| 2 | 3 | 7 | NOT REQUIRED | QM | 40% |
| 2 | 3 | 8 | | | |
| 2 | 3 | 9 | | | |
| ... | ... | ... | ... | | ... |

CORE ALLOCATION INFORMATION

| CORE ID | ASIL | EXECUTION FUNCTION GROUP | CPU UTILIZATION RATE | MARGIN | CPU AVAILABILITY RATE |
|---|---|---|---|---|---|
| 1 | D | 1 | 20% | 20% | 60% |
| 2 | D | 2 | 70% | 20% | 10% |
| 3 | ... | ... | 80% | 20% | 0% |

SCHEDULING TABLE

| TASK GROUP | START TIME | | | | | | | | | |
|---|---|---|---|---|---|---|---|---|---|---|
| | 0 | 1 | 2 | 3 | 4 | 5 | 6 | 7 | 8 | 9 |
| 1 | 1 | 2 | 2 | 2 | | | | | | 3 |
| 2 (MOVED) | 4 | 5 | 5 | 5 | | | | | | 6 |

SCHEDULING TABLE

| TASK GROUP | START TIME | | | | | | | | | |
|---|---|---|---|---|---|---|---|---|---|---|
| | 0 | 1 | 2 | 3 | 4 | 5 | 6 | 7 | 8 | 9 |
| 1 | 1 | 2 | 2 | 2 | | | | | | 3 |
| 2 (MOVED) | | | | | 4 | 5 | 5 | 5 | 6 | |

TASK SET INFORMATION

| CORE ID | TASK GROUP | TASK ID | PROPERTY | CYCLE | PRIORITY | START TIME | DURATION | MARGIN |
|---|---|---|---|---|---|---|---|---|
| 1 | 1 | 1 | R | 10ms | 10 | 0 | 1 | 0 |
| 1 | 1 | 2 | E | 10ms | 10 | 1 | 2 | 2 |
| 1 | 1 | 3 | W | 10ms | 1 | 9 | 1 | 0 |
| 2 | 2 | 4 | R | 10ms | 11 | 0 | 1 | 0 |
| 2 | 2 | 5 | E | 10ms | 11 | 1 | 2 | 2 |
| 2 | 2 | 6 | W | 10ms | 1 | 9 | 1 | 0 |
| ... | ... | ... | ... | ... | | .. | ... | ... |

FIG. 10B

232
TASK SET INFORMATION

| CORE ID | TASK GROUP | TASK ID | PROPERTY | PRIORITY | CYCLE | START TIME | DURATION | MARGIN |
|---|---|---|---|---|---|---|---|---|
| 1 | 1 | 1 | R | 10 | 10ms | 0 | 1 | 0 |
| 1 | 1 | 2 | E | 10 | 10ms | 1 | 2 | 2⇒1 |
| 1 | 1 | 3 | W | 1 | 10ms | 9 | 1 | 0 |
| 2⇒1 | 2 | 4 | R | 11 | 10ms | 0 | 1 | 0 |
| 2⇒1 | 2 | 5 | E | 11 | 10ms | 1 | 2 | 2⇒1 |
| 2⇒1 | 2 | 6 | W | 1 | 10ms | 9 | 1 | 0 |
| ... | ... | ... | ... | | ... | .. | ... | ... |

TASK SET INFORMATION

| CORE ID | TASK GROUP | TASK ID | PROPERTY | PRIORITY | CYCLE | START TIME | DURATION | MARGIN |
|---|---|---|---|---|---|---|---|---|
| 1 | 1 | 1 | R | 10 | 10ms | 0 | 1 | 0 |
| 1 | 1 | 2 | E | 10 | 10ms | 1 | 2 | 1 |
| 1 | 1 | 3 | W | 1 | 10ms | 9 | 1 | 0 |
| 1 | 2 | 4 | R | 11 | 10ms | 0 | 1 | 0 |
| 1 | 2 | 5 | E | 11 | 10ms | 1 | 2 | 1 |
| 1 | 2 | 6 | W | 1 | 10ms | 9⇒8 | 1 | 0 |
| ... | ... | ... | ... | ... | ... | ... | ... | ... |

SCHEDULING TABLE

| TASK GROUP | START TIME | | | | | | | | | |
|---|---|---|---|---|---|---|---|---|---|---|
| | 0 | 1 | 2 | 3 | 4 | 5 | 6 | 7 | 8 | 9 |
| 1 | 1 | 2 | 2 | 2 | | | | | | 3 |
| 2 (MOVED) | 4 | 5 | 5 | 5 | | | | | | 6 |

FIG. 11B

237
SCHEDULING TABLE

| TASK GROUP | START TIME | | | | | | | | | |
|---|---|---|---|---|---|---|---|---|---|---|
| | 0 | 1 | 2 | 3 | 4 | 5 | 6 | 7 | 8 | 9 |
| 1 | 1 | 2 | 2 | 2 | | | | | | 3 |
| 2 (MOVED) | 4 | 5 | 5 | 5 | | | | | 6 | |

TASK SET INFORMATION

| CORE ID | TASK GROUP | TASK ID | PROPERTY | CYCLE | PRIORITY | START TIME | DURATION | MARGIN |
|---|---|---|---|---|---|---|---|---|
| 1 | 1 | 1 | R | 10ms | 10 | 0 | 1 | 0 |
| 1 | 1 | 2 | E | 10ms | 10 | 1 | 2 | 2 |
| 1 | 1 | 3 | W | 10ms | 1 | 9 | 1 | 0 |
| 2 | 2 | 4 | R | 10ms | 11 | 0 | 1 | 0 |
| 2 | 2 | 5 | E | 10ms | 11 | 1 | 2 | 2 |
| 2 | 2 | 6 | W | 10ms | 1 | 9 | 1 | 0 |
| ... | ... | ... | ... | ... | | ... | ... | ... |

TASK SET INFORMATION

| CORE ID | TASK GROUP | TASK ID | PROPERTY | PRIORITY | CYCLE | START TIME | DURATION | MARGIN |
|---|---|---|---|---|---|---|---|---|
| 1 | 1 | 1 | R | 10 | 10ms | 0 | 1 | 0 |
| 1 | 1 | 2 | E | 10 | 10ms | 1 | 2 | 2⇒0 |
| 1 | 1 | 3 | W | 1 | 10ms | 9 | 1 | 0 |
| 2⇒1 | 2 | 4 | R | 11 | 10ms | 0 | 1 | 0 |
| 2⇒1 | 2 | 5 | E | 11 | 10ms | 1 | 2 | 2 |
| 2⇒1 | 2 | 6 | W | 1 | 10ms | 9 | 1 | 0 |
| ... | ... | ... | ... | | ... | .. | ... | ... |

TASK SET INFORMATION

| CORE ID | TASK GROUP | TASK ID | PROPERTY | PRIORITY | CYCLE | START TIME | DURATION | MARGIN |
|---|---|---|---|---|---|---|---|---|
| 1 | 1 | 1 | R | 10 | 10ms | 0 | 1 | 0 |
| 1 | 1 | 2 | E | 10 | 10ms | 1 | 2 | 0 |
| 1 | 1 | 3 | W | 1 | 10ms | 9 | 1 | 0 |
| 1 | 2 | 4 | R | 11 | 10ms | 0 | 1 | 0 |
| 1 | 2 | 5 | E | 11 | 10ms | 1 | 2 | 2 |
| 1 | 2 | 6 | W | 1 | 10ms | 9⇒8 | 1 | 0 |
| ... | ... | ... | ... | ... | ... | ... | ... | ... |

FIG. 14

PROCESS CONTINUITY DETERMINATION TABLE (334)

| FUNCTION GROUP | TASK GROUP | TASK ID | PROCESS CONTINUITY | ASIL | REQUIRED CPU UTILIZATION RATE |
|---|---|---|---|---|---|
| 1 | 1 | 1 | REQUIRED | D | 20% |
| 1 | 1 | 2 | | | |
| 1 | 1 | 3 | | | |
| 1 | 2 | 4 | REQUIRED | D | 30% |
| 1 | 2 | 5 | | | |
| 1 | 2 | 6 | | | |
| 2 | 3 | 7 | NOT REQUIRED | QM | 40% |
| 2 | 3 | 8 | | | |
| 2 | 3 | 9 | | | |
| ... | ... | ... | ... | | ... |

FIG. 15

CORE ALLOCATION INFORMATION (335)

| CORE ID | ASIL | EXECUTION FUNCTION GROUP | CPU UTILIZATION RATE | MARGIN | CPU AVAILABILITY RATE |
|---|---|---|---|---|---|
| 1 | D | 1 | 20% | 20% | 60% |
| 2 | D | 1,2 | 70% | 20% | 10% |
| 3 | ... | ... | 80% | 20% | 0% |

FIG. 16A

SCHEDULING TABLE (336)

| TASK GROUP | START TIME | | | | | | | | | |
|---|---|---|---|---|---|---|---|---|---|---|
| | 0 | 1 | 2 | 3 | 4 | 5 | 6 | 7 | 8 | 9 |
| 1 | 1 | 2 | 2 | 2 | | | | | | 3 |
| 2 (MOVED) | 4 | 5 | 5 | 5 | | | | | | 6 |

SCHEDULING TABLE

| TASK GROUP | START TIME | | | | | | | | | |
|---|---|---|---|---|---|---|---|---|---|---|
| | 0 | 1 | 2 | 3 | 4 | 5 | 6 | 7 | 8 | 9 |
| 1 | 1 | 2 | 2 | 2 | | | | | | 3 |
| 2 (MOVED) | 4 | 5 | 5 | 5 | | | | | 6 | |

TASK SET INFORMATION 531

| ECU ID | CORE ID | TASK GROUP | TASK ID | CYCLE | START TIME | END TIME | MARGIN |
|---|---|---|---|---|---|---|---|
| 1 | ... | ... | ... | ... | .. | ... | ... |
| 1 | 2 | 2 | 4 | 10ms | 0 | 1 | 0 |
| 1 | 2 | 2 | 5 | 10ms | 1 | 5 | 2 |
| 1 | 2 | 2 | 6 | 10ms | 9 | 10 | 0 |
| 1 | ... | ... | ... | ... | .. | ... | ... |
| 2 | 3 | 4 | 10 | 10ms | 0 | 1 | 0 |
| 2 | 3 | 4 | 11 | 10ms | 1 | 5 | 2 |
| 2 | 3 | 4 | 12 | 10ms | 9 | 10 | 0 |
| 2 | ... | ... | ... | ... | .. | ... | ... |

TASK SET INFORMATION

| CORE ID | TASK GROUP | TASK ID | PROPERTY | CYCLE | START TIME | END TIME | MARGIN |
|---|---|---|---|---|---|---|---|
| 1 | 4 | 10 | R | 10ms | 0 | 1 | 0 |
| 1 | 4 | 11 | E | 10ms | 1 | 5⇒4 | 2⇒1 |
| 1 | 4 | 12 | W | 10ms | 9 | 10 | 0 |
| 1 | 2 | 4 | R | 10ms | 0 | 1 | 0 |
| 1 | 2 | 5 | E | 10ms | 1 | 5⇒4 | 2⇒1 |
| 1 | 2 | 6 | W | 10ms | 9 | 10 | 0 |
| ... | ... | ... | ... | ... | ... | ... | ... |

TASK SET INFORMATION

| CORE ID | TASK GROUP | TASK ID | PROPERTY | CYCLE | START TIME | END TIME | MARGIN |
|---|---|---|---|---|---|---|---|
| 1 | 4 | 10 | R | 10ms | 0 | 1 | 0 |
| 1 | 4 | 11 | E | 10ms | 1 | 4 | 1 |
| 1 | 4 | 12 | W | 10ms | 9 | 10 | 0 |
| 1 | 2 | 4 | R | 10ms | 0 | 1 | 0 |
| 1 | 2 | 5 | E | 10ms | 1 | 4 | 1 |
| 1 | 2 | 6 | W | 10ms | 8 | 9 | 0 |
| ... | ... | ... | ... | ... | ... | ... | ... |

FIG. 22

PROCESS CONTINUITY DETERMINATION TABLE (534)

| FUNCTION GROUP | TASK GROUP | TASK ID | PROCESS CONTINUITY | ASIL | REQUIRED CPU UTILIZATION RATE |
|---|---|---|---|---|---|
| 1 | 1 | 1 | REQUIRED | D | 70% |
| 1 | 1 | 2 | | | |
| 1 | 1 | 3 | | | |
| 2 | 2 | 4 | REQUIRED | D | 30% |
| 2 | 2 | 5 | | | |
| 2 | 2 | 6 | | | |
| 2 | 3 | 7 | NOT REQUIRED | QM | 40% |
| 2 | 3 | 8 | | | |
| 2 | 3 | 9 | | | |
| 3 | 4 | 10 | REQUIRED | D | 20% |
| 3 | 4 | 11 | | | |
| 3 | 4 | 12 | | | |
| ... | ... | ... | ... | ... | ... |

FIG. 23

CORE ALLOCATION INFORMATION (535)

| ECU ID | CORE ID | ASIL | EXECUTION FUNCTION GROUP | CPU UTILIZATION RATE | MARGIN | CPU AVAILABILITY RATE |
|---|---|---|---|---|---|---|
| 1 | 1 | D | 1 | 70% | 20% | 10% |
| | 2 | D | 2 | 70% | 20% | 10% |
| 2 | 1 | D | 3 | 20% | 20% | 60% |
| | ... | ... | ... | ... | ... | ... |

FIG. 24A

SCHEDULING TABLE 536

| TASK GROUP | START TIME | | | | | | | | | |
|---|---|---|---|---|---|---|---|---|---|---|
| | 0 | 1 | 2 | 3 | 4 | 5 | 6 | 7 | 8 | 9 |
| 4 | 10 | 11 | 11 | 11 | | | | | | 12 |
| 2 (MOVED) | 4 | 5 | 5 | 5 | | | | | | 6 |

FIG. 24B

SCHEDULING TABLE 537

| TASK GROUP | START TIME | | | | | | | | | |
|---|---|---|---|---|---|---|---|---|---|---|
| | 0 | 1 | 2 | 3 | 4 | 5 | 6 | 7 | 8 | 9 |
| 4 | 10 | 11 | 11 | 11 | | | | | | 12 |
| 2 (MOVED) | | | | | 4 | 5 | 5 | 5 | 6 | |

VEHICLE CONTROL DEVICE

TECHNICAL FIELD

The present invention relates to a vehicle control device including a plurality of CPUs.

BACKGROUND ART

An automobile control system includes a plurality of electronic control units (ECU). Such ECUs are demanded to execute sensor input processes, processes for calculating target values for control processes, and processes for controlling actuators while meeting a strict time constraint (deadline). Integration of ECUs has been promoted to achieve cost reductions and space saving, and a multi-core configuration has come to be adapted to cope with a requirement for higher computational complexity.

However, when a core executing the control process fails, the core becomes incapable of continuing the process any longer. Therefore, fallback control for stopping the entire ECU is executed to ensure the safety.

Hence, there is a demand for a technique for improving the availability so that the control process can be continued.

With the technology described in PTL 1, setting information (core allocation information) defining which core is to execute software is stored in advance, in a manner associated with an operation mode. When a failure of the core is then detected, the operation mode is changed, by being triggered by a reset, to another mode in which the software can be executed only by using the cores capable of normally operating. In this manner, it is possible to switch the core on which the software is executed, and to improve the availability.

CITATION LIST

Patent Literature

PTL 1: JP 2018-112977 A

SUMMARY OF INVENTION

Technical Problem

However, with the technology described in PTL 1, it is not possible to ensure that the core to which the execution is moved is capable of executing the software in real time. In addition, because such a configuration requires designing in advance, it is difficult to cope with software updates.

The present invention has been made to solve the problem described above, and an object of the present invention is to provide a vehicle control device capable of improving the safety and the availability by determining a core to which software is to be moved depending on the core having failed, determining whether there is any contention in the timings at which software is executed, based on software operations on the core resultant of moving the software, and performing an arbitration when there is a contention.

Solution to Problem

In order to solve the problem described above, the present invention is configured as follows.

A vehicle control device including a CPU that executes a plurality of tasks in clock-synchronization, the vehicle control device includes: a failure detecting unit that detects a failure of a core in the CPU; and an execution timing arbitration unit that allocates a task having been executed by the core having failed, to a non-failed core; wherein, when the task having been executed by the failed core is allocated to the non-failed core, the execution timing arbitration unit shifts an execution time slot so as to make the task being executed by the non-failed core executable, thereby setting time slots in which the plurality of tasks are executable.

Advantageous Effects of Invention

With the vehicle control device according to the present invention, it is possible to provide a vehicle control device capable of improving the safety and the availability by determining the core to which the software is to be moved, depending on which core has failed, determining whether there is any contention in the timings of executions of software, based on the operations of the software on the core resultant of moving the software, and performing an arbitration when a contention occurs.

BRIEF DESCRIPTION OF DRAWINGS

FIG. 3A is a diagram illustrating task set information according to the first embodiment.

FIG. 3B is a diagram illustrating task set information according to the first embodiment.

FIG. 3C is a diagram illustrating task set information according to the first embodiment.

FIG. 4 is a diagram illustrating a process continuity determination table according to the first embodiment.

FIG. 5 is a diagram illustrating core allocation information according to the first embodiment.

FIG. 6A is a diagram illustrating a scheduling table according to the first embodiment.

FIG. 6B is a diagram illustrating a scheduling table according to the first embodiment.

FIG. 10A is a diagram illustrating task set information according to the second embodiment.

FIG. 10B is a diagram illustrating task set information according to the second embodiment.

FIG. 10C is a diagram illustrating task set information according to the second embodiment.

FIG. 11A is a diagram illustrating a scheduling table according to the second embodiment.

FIG. 11B is a diagram illustrating a scheduling table according to the second embodiment.

FIG. 13A is a diagram illustrating task set information according to the third embodiment.

FIG. 13B is a diagram illustrating task set information according to the third embodiment.

FIG. 13C is a diagram illustrating task set information according to the third embodiment.

FIG. 14 is a diagram illustrating a process continuity determination table according to the third embodiment.

FIG. 15 is a diagram illustrating core allocation information in the third embodiment.

FIG. 16A is a diagram illustrating a scheduling table according to the third embodiment.

FIG. 16B is a diagram illustrating a scheduling table according to the third embodiment.

FIG. 21B is a diagram illustrating task set information according to the fifth embodiment.

FIG. 21C is a diagram illustrating task set information according to the fifth embodiment.

FIG. 22 is a diagram illustrating a process continuity determination table according to the fifth embodiment.

FIG. 23 is a diagram illustrating core allocation information in the fifth embodiment.

FIG. 24A is a diagram illustrating a scheduling table according to the fifth embodiment.

FIG. 24B is a diagram illustrating a scheduling table according to the fifth embodiment.

DESCRIPTION OF EMBODIMENTS

A vehicle control device according to the present invention detects a failure of a core executing control software, selects a process to be continued, among the processes affected by the failed core, and determines a core on which the process to be continued is to be executed.

The vehicle control device also determines whether there will be any contention in the timings of execution, as a result of adding the process to be continued, and makes an arbitration. The vehicle control device is then operated at the timings resultant of the arbitration.

Some embodiments of the present invention will now be explained with reference to some drawings.

First Embodiment

Figure 1:
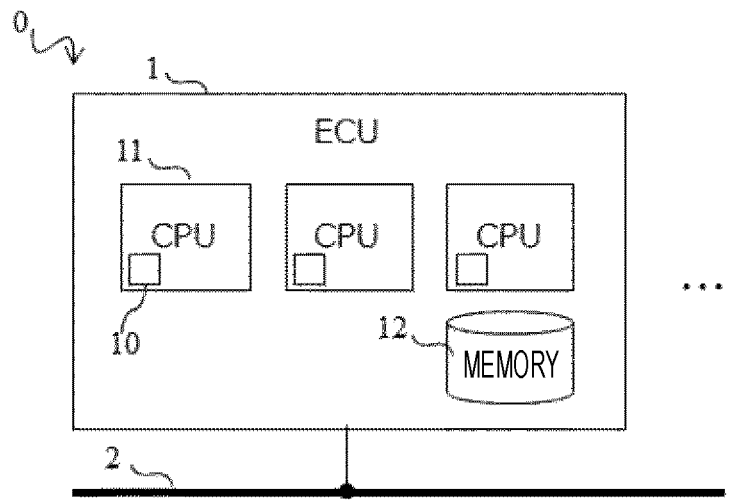
FIG. 1 is a configuration diagram of a vehicle control device according to first, second, third, and fourth embodiments.

FIG. 1 is a diagram illustrating a configuration of a system according to a first embodiment of the present invention. A vehicle control device 0 includes an ECU 1 and a network 2. The ECU 1 includes a plurality of CPUs 11 and a memory 12. The plurality of CPUs 11 execute tasks in clock-synchronization. Because each of the CPUs 11 may include a plurality of cores 10, one CPU may be a multi-core processor, and fall within the scope of the present invention. However, in the first embodiment, one CPU has one core 10. Because the ECU 1 includes a plurality of CPUs 11, a plurality of cores 10 are disposed in the ECU 1. The memory 12 stores therein a program. The number of the memories 12 is not limited to any particular number.

Figure 2:
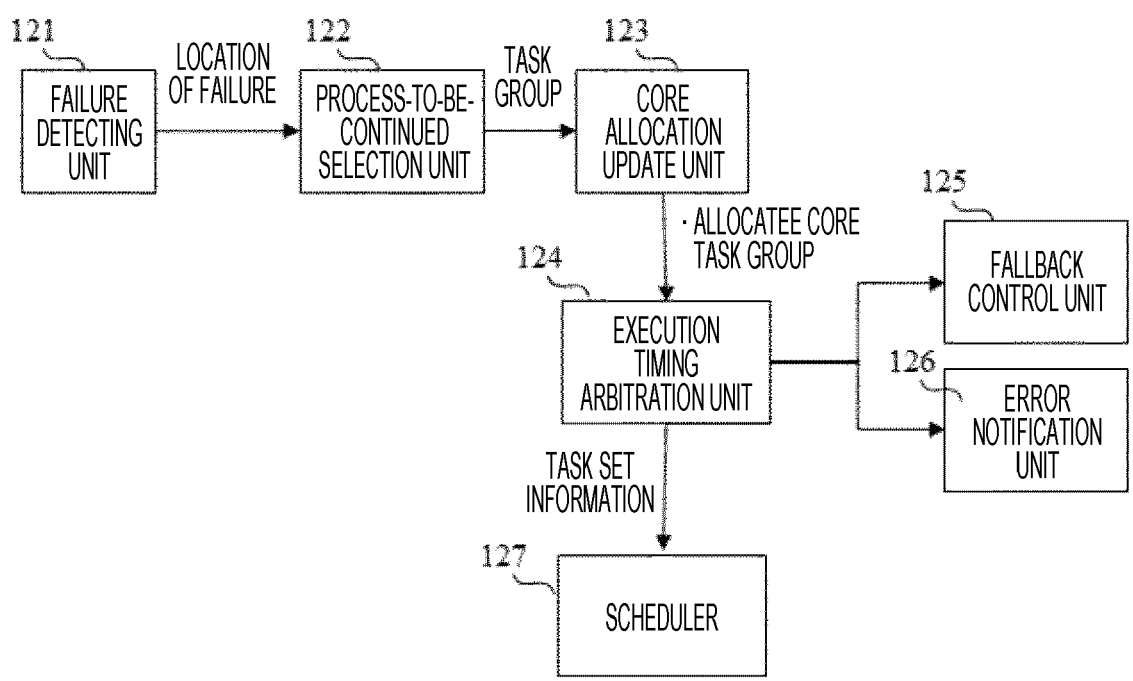
FIG. 2 is a functional block diagram of the vehicle control device according to the first, the second, and the third embodiments.

FIG. 2 is a functional block diagram of the ECU 1 according to the first embodiment. A failure detecting unit 121 in the ECU 1 detects a failure of a core 10, and notifies the location of failure to the process-to-be-continued selection unit 122. The process-to-be-continued selection unit 122 notifies a core allocation update unit 123 of a task group the processes of which are to be continued. In the first embodiment, a unit in which a piece of software process is executed is referred to as a task. Execution of a task is managed by the operating system (OS), in the same manner as for a thread.

The process of the control software is executed in a task, so that a plurality of processes of the control software may be executed in one task. The core allocation update unit 123 selects an allocatee core, and notifies the execution timing arbitration unit 124 of the allocatee core, as well as the task group.

The execution timing arbitration unit 124 detects whether there is any contention in the timings at which the newly assigned group of tasks is executed and at which a group of tasks having been originally assigned is executed. In other words, the execution timing arbitration unit 124 verifies whether the non-failed core 10 can execute the task having been executed by the failed core 10 in the same time slot. The execution timing arbitration unit 124 then makes an arbitration by changing (shifting) the timing at which the core 10 executes the task (execution time slot). The execution time slot is changed within a range in which the input/output time constraints of the core 10 permits. The execution timing arbitration unit 124 sets time slots in which a plurality of tasks of the failed core 10 can be executed independently, and sets the time slots as arbitrated task set information. The arbitrated task set information is notified to a scheduler 127. The scheduler 127 executes the tasks by time-sharing, based on the task set information. The scheduler 127 controls the tasks to be executed in clock-synchronization, so that a specific task is executed in a specific time slot. When the arbitration fails, a fallback control unit 125 is executed, and the error notification unit 126 notifies an error to another ECU over the network.

FIGS. 3A, 3B, and 3C are diagrams illustrating task set information 131, 132, and 133 according to the first embodiment. The task set information includes core ID, task group, task ID, property, cycle, start time, end time, and margin.

A core ID is an ID for identifying a CPU 11. A task group specifies a set of pieces of control software, and the value specifies a task group ID. A task ID specifies an ID for identifying a task. Property specifies the role of the task. R specifies an input processing task of executing an input process to a task group (Copy-In). E represents a control processing task of executing control process, and W represents an output processing task of outputting a result of the control process calculated by E (Copy-Out).

A cycle specifies an interval at which the task is executed. Start time specifies the time in which execution of the task is started, and specified in units of ms. The end time is the time in which the task is ended, and specified in units of ms. A margin is an extra time (an extra time for a duration of the task) reserved considering the possibility of fluctuations in the duration of the task, and the end time is put behind by this margin time. The margin is specified in units of ms.

FIG. 3A) illustrates the task set information 131 before a core failure. FIG. 3B illustrates the task set information 132 after an allocatee core of the task group has been determined but before arbitration, and FIG. 3C illustrates the task set information 133 after the arbitration.

FIG. 4 illustrates a process continuity determination table 134 according to the first embodiment. The process continuity determination table 134 includes function group, task group, task ID, process continuity, ASIL, and required CPU utilization rate. A function group specifies a group of vehicle control functions, and the value specifies a function group ID. Examples thereof include a group of pieces of software for controlling the engine, and a group of pieces of software for calculating a target steering angle and an acceleration/deceleration command for a drive aiding system or automatic driving.

A task group is a set of one or more tasks for implementing a function group, and the value indicates a task group ID. One function group includes a task group that includes one or more tasks. Furthermore, one task group includes R, E, and W, and at least the output processing task is executed by time-sharing. E is performed after R and before W. A task ID specifies an ID for identifying a task. Process continuity specifies whether the process of the task group is to be continued when the core fails. "Required" specifies that the process needs to be continued, and "not required" indicates that the process does not need to be continued. ASIL is an abbreviation of Automotive Safety Integrity Levels defined in the functional safety standard ISO 262626, and specifies a required level of automobile safety. The levels include QM, and A to D, with D being the highest requirement. The required CPU utilization rate means the CPU utilization rate consumed in executing the task group.

FIG. 5 illustrates core allocation information 135 according to the first embodiment. The core allocation information 135 includes core ID, ASIL, execution function group, CPU utilization rate, margin, and CPU availability rate. A core ID is an ID for identifying a CPU 11. ASIL specifies ASIL to which the core is to conform. An execution function group specifies a function group being executed by the core 10, and the value specifies a function group ID.

The CPU utilization rate is the CPU load consumed in executing the execution function group. A margin represents a time allowance required to ensure the real-timeness even when the duration of the task group deviates from the predicted time. A CPU availability rate specifies the degree by which the CPU is available for executing another task group, with the CPU utilization rate and the margin excluded.

FIGS. 6A and 6B illustrate scheduling tables 136 and 137 according to the first embodiment. The scheduling table includes task group and start time. A task group specifies the task group ID executed on a specific core. Start time specifies a task ID executed in a specific time. FIG. 6A illustrates the scheduling table 136 before the arbitration, and FIG. 6B illustrates the scheduling table 137 after the arbitration.

The sequence of an operation according to the first embodiment will now be explained in detail.

Figure 7:
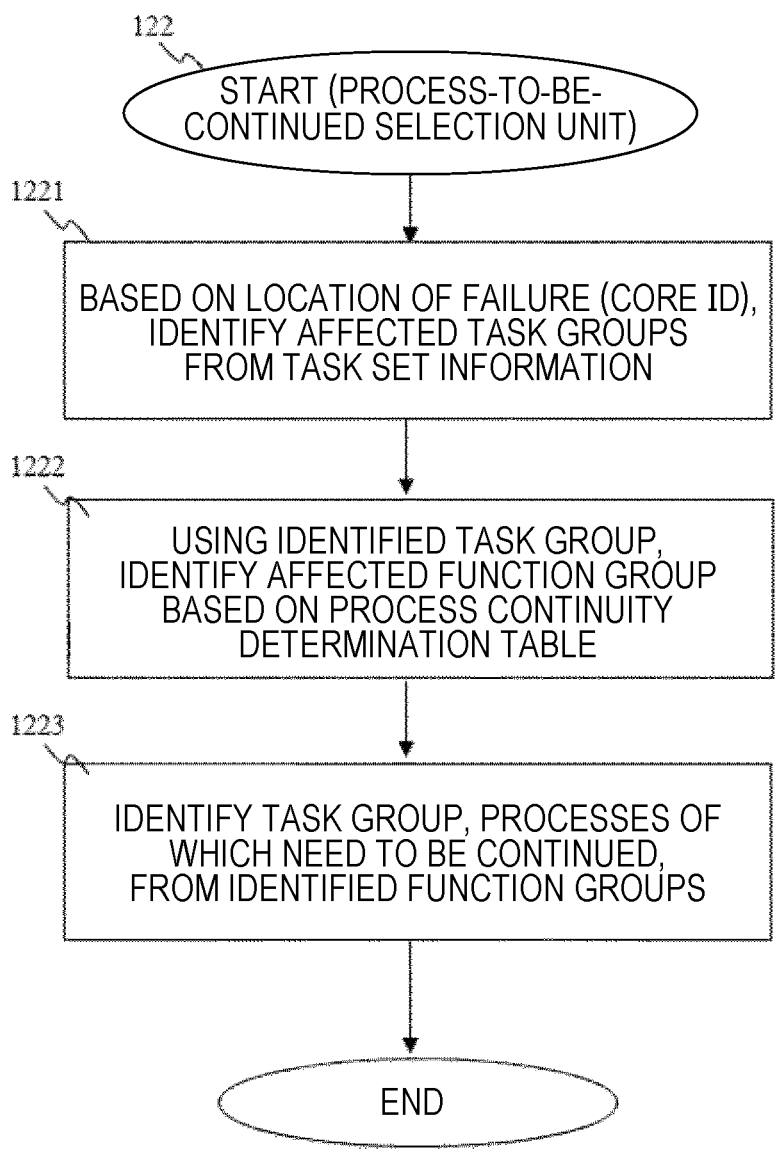
FIG. 7 is a flowchart of a process performed by a process-to-be-continued determination unit according to the first embodiment.

FIG. 7 is the sequence of the process performed by the process-to-be-continued determination unit 122. Each of the steps included in FIG. 7 will be explained below.

(FIG. 7: Step 1221)

Based on the location of failure (core ID), the process-to-be-continued selection unit 122 identifies task groups that are affected thereby, from the task set information. Specifically, task groups being executed by the core ID is identified from the task set information 131.

(FIG. 7: Step 1222)

The process-to-be-continued selection unit 122 identifies a function group affected as a result of the interruption of the task groups, based on the process continuity determination table 134, using the identified task groups. In step 1222, based on the process continuity determination table 134, the process-to-be-continued selection unit 122 identifies the function group affected by the failed core 10, based on the automobile safety standard.

(FIG. 7: Step 1223)

The process-to-be-continued selection unit 122 identifies a task group the processes of which need to be continued, from the identified function groups, based on the process continuity determination table 134.

Figure 8:
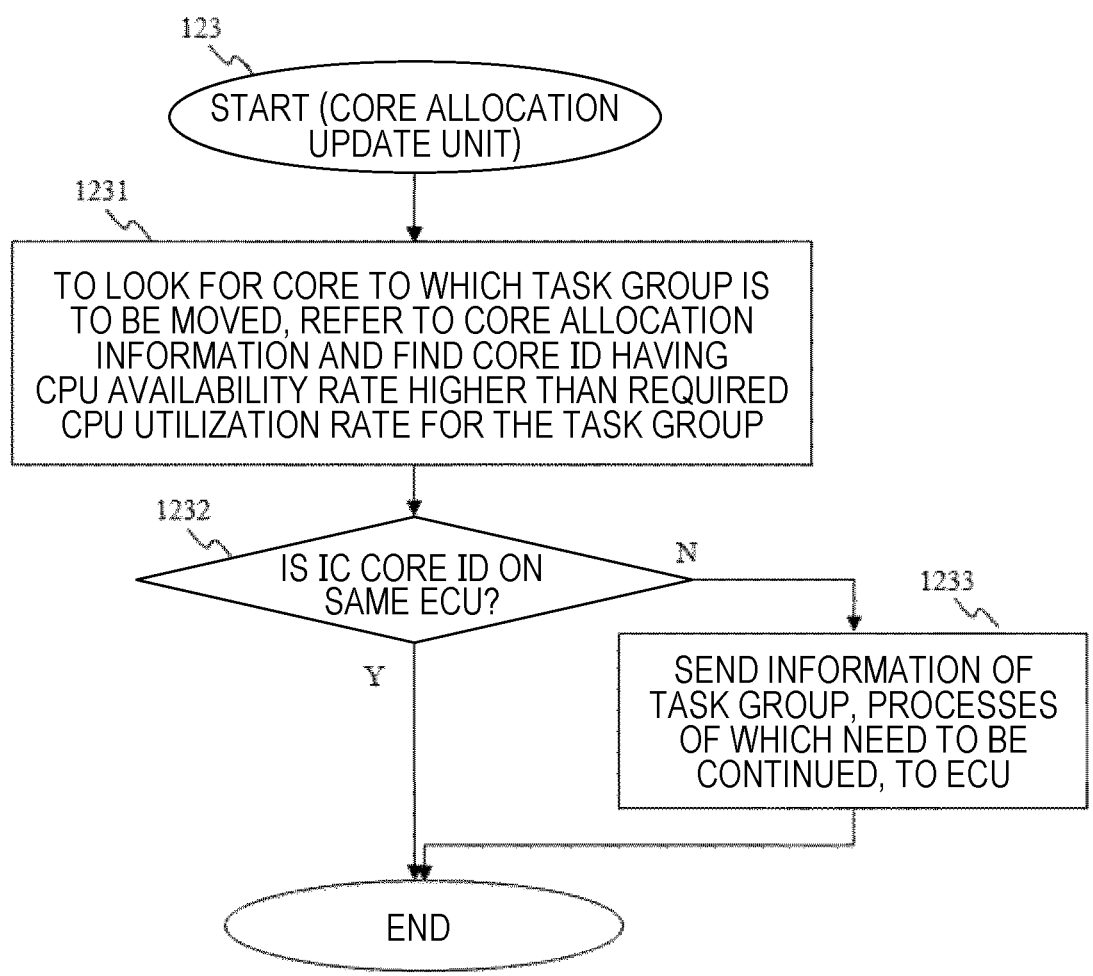
FIG. 8 is a flowchart of a process performed by a core allocation update unit according to the first embodiment.

FIG. 8 is a flowchart of the process performed by the core allocation update unit 123. Each of the steps included in FIG. 8 will be explained below.

(FIG. 8: Step 1231)

In order to search for a core to which the task group is to be moved, the core allocation update unit 123 refers to the core allocation information 135, and finds a core ID the CPU availability rate of which is higher than the required CPU utilization rate for the task group.

(FIG. 8: Step 1232)

The core allocation update unit 123 determines whether the core ID found in step 1231 is on the same ECU as the ECU from which the failure has been detected. If true, the sequence of this process is ended. If false, the process goes to step 1233.

(FIG. 8: Step 1233)

The core allocation update unit 123 sends the core ID found in step 1231 and the information of the task group the processes of which need to be continued by the ECU, to the ECU that includes that allocatee core ID.

Figure 9:
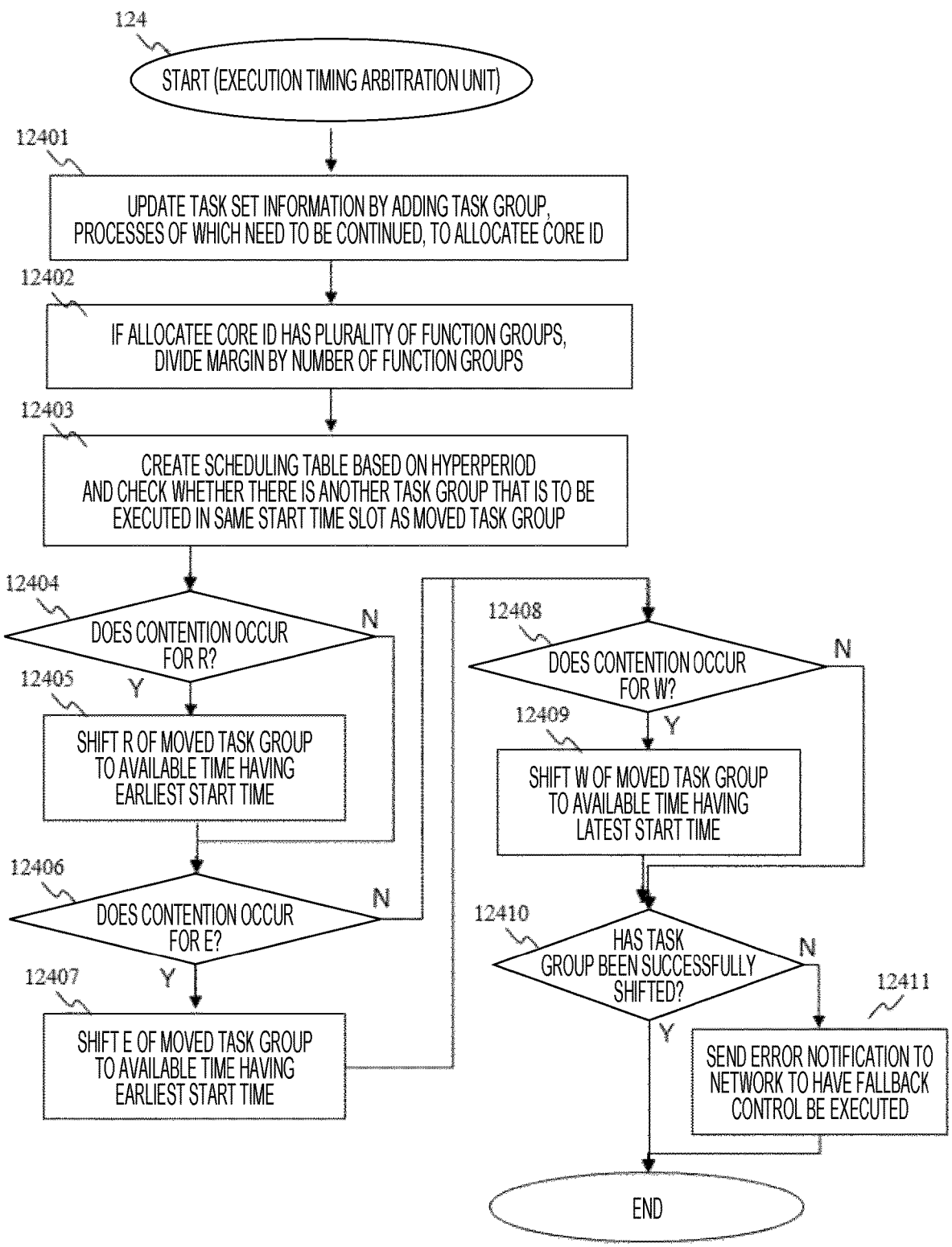
FIG. 9 is a flowchart of a process performed by an execution timing arbitration unit according to the first embodiment.

FIG. 9 is a flowchart of the process performed by the execution timing arbitration unit 124. Each of the steps included in FIG. 9 will be explained below.

(FIG. 9: Step 12401)

The execution timing arbitration unit 124 updates the task set information by adding the task group the processes of which need to be continued, to the allocatee core ID, to create the task set information 132 (FIG. 3B).

(FIG. 9: Step 12402)

If the allocatee core ID has a plurality of function groups, the execution timing arbitration unit 124 divides the margin by the number of the function groups (FIG. 3B).

(FIG. 9: Step 12403)

The execution timing arbitration unit 124 then creates the scheduling table (FIG. 6A) based on a hyperperiod, and checks whether there is another task group that is to be executed at the same start time slot, as the task group the processes of which need to be continued.

(FIG. 9: Step 12404)

If there are some tasks to be executed in the same time slot, the execution timing arbitration unit 124 determines whether the contention occurs for R of the task group the processes of which need to be continued. If true, the process is shifted to step 12405. If false, the process is shifted to step 12406.

(FIG. 9: Step 12405)

The execution timing arbitration unit 124 shifts R of the task group the processes of which need to be continued, to an available time having the earliest start time.

(FIG. 9: Step 12406)

If there are some tasks to be executed in the same time slot, the execution timing arbitration unit 124 determines whether the contention occurs for E of the task group the processes of which need to be continued. If true, the process is shifted to step 12407. If false, the process is shifted to step 12408.

(FIG. 9: Step 12407)

The execution timing arbitration unit 124 shifts E of the task group the processes of which need to be continued, to an available time having the earliest start time. In order to maintain the order of executions within the task group, E is executed later in time than R.

(FIG. 9: Step 12408)

If there are some tasks to be executed in the same time slot, the execution timing arbitration unit 124 determines whether the contention occurs for W of the task group the processes of which need to be continued. If true, the process is shifted to step 12409. If false, the process is shifted to step 12410.

(FIG. 9: Step 12409)

The execution timing arbitration unit 124 shifts W of the task group the processes of which need to be continued, to an available time having the latest start time. In order to maintain the order of executions within the task group, W is executed later in time than E. E may be separated in time from W. E may end up being later than the time predicted, but this difference is absorbed by the margin. By keeping E and W separate, as currently is, the timing at which W is executed is fixed. Therefore, any change is not required in the other task groups, and the real-timeness can be ensured. The execution timing arbitration unit 124 arbitrates the timings of the execution by changing (shifting) the timing at which the tasks in the group are executed while maintaining the order at which the input processing task, the control processing task, and the output processing task are executed.

(FIG. 9: Step 12410)

The execution timing arbitration unit 124 determines whether the tasks W, E, and R have been successfully shifted to available start time. If the determination result is true, the sequence of this operation is ended. If the determination result is false, the process is shifted to step 12411.

(FIG. 9: Step 12411)

The execution timing arbitration unit 124 sends an error information to the network 2 via the error notification unit 126, notifies the fallback control unit 125 to execute the fallback control, and the sequence of the operation is ended.

As described above, the execution timing arbitration unit 124 determines whether the input processing task R and the control processing task E can be shifted to the time before the output task is to be executed, within the same cycle. If the input processing task R and the control processing task E cannot be shifted, the execution timing arbitration unit 124 sends an error so that the fallback control is executed. Note that, in step 12411, the execution timing arbitration unit 124 may notify either the error or the fallback control. According to the first embodiment, even if a core fails, another core can execute the task the processing of which needs to be continued. Therefore, availability is improved.

In addition, according to the first embodiment, even if there is a contention in the timings at which the processes are to be executed, assuming that another core is to execute the task the process of which needs to be continued, the execution timings are shifted to available time while maintaining the order in which the tasks are executed. Therefore, it is possible to keep the deadline without affecting the result of the control computation.

In addition, according to the first embodiment, if there is a contention in the timings at which the processes are to be executed, the duration of the task the processing of which needs to be continued is changed, so that the task that has been originally being executed is not affected thereby. Therefore, the scope in which the real-timeness is affected can be localized.

In addition, according to the first embodiment, because the task E and the task W are separated, and temporally distant from each other, even if the execution of the task E takes longer than anticipated, the difference is absorbed by the margin, and does not affect the duration of the task W. Therefore, the scope to be verified can be localized.

According to the first embodiment, it is possible to provide a vehicle control device capable of improving the safety and the availability by determining the core to which the software is to be moved, depending on which core has failed, determining whether there is any contention in the timings at which the software is executed, based on the operations of the software on the core after the software is moved, and performing an arbitration when a contention occurs. Note that, according to the first embodiment, the task is implemented based on time-sharing scheduling in which the timings at which the tasks are executable are managed based on the time slot, but the present invention is not limited thereto.

Second Embodiment

A second embodiment is an example in which the present invention is implemented with priority scheduling. Only the differences from the first embodiment will be explained.

FIG. 10 illustrates task set information 231, 232, and 233 according to the second embodiment. The task set information includes core ID, task group, task ID, property, cycle, priority, start time, duration, and margin. The core ID, the task group, the task ID, the property, the cycle, the start time, and the margin are the same as those in the first embodiment. A priority is a number for determining the order which one of executable tasks is to be executed first, when there are a plurality of executable tasks, and a smaller number indicates a higher priority. Duration is the length of time required in executing the task. As the duration, a time length that is based on a prediction established at the time of designing is defined, but a margin is reserved considering a possibility of the duration becoming longer than anticipated, after the shipment. The time length corresponding to the margin is not included in the duration. Although the same priorities are assigned to R and E of the same task group, the present invention is not limited thereto. These priorities may be changed as long as E is executed later than R. The priority, by contrast, assigned to W is higher than those assigned to R and E. This is to localize the scope to be verified, by using a fixed timing for the output so as not to be affected by the others.

FIGS. 11A and 11B illustrate scheduling tables 236 and 237 according to the second embodiment. The scheduling tables include task group and start time, and the task group and the start time indicate the same thing as those in the first embodiment.

Figure 12:
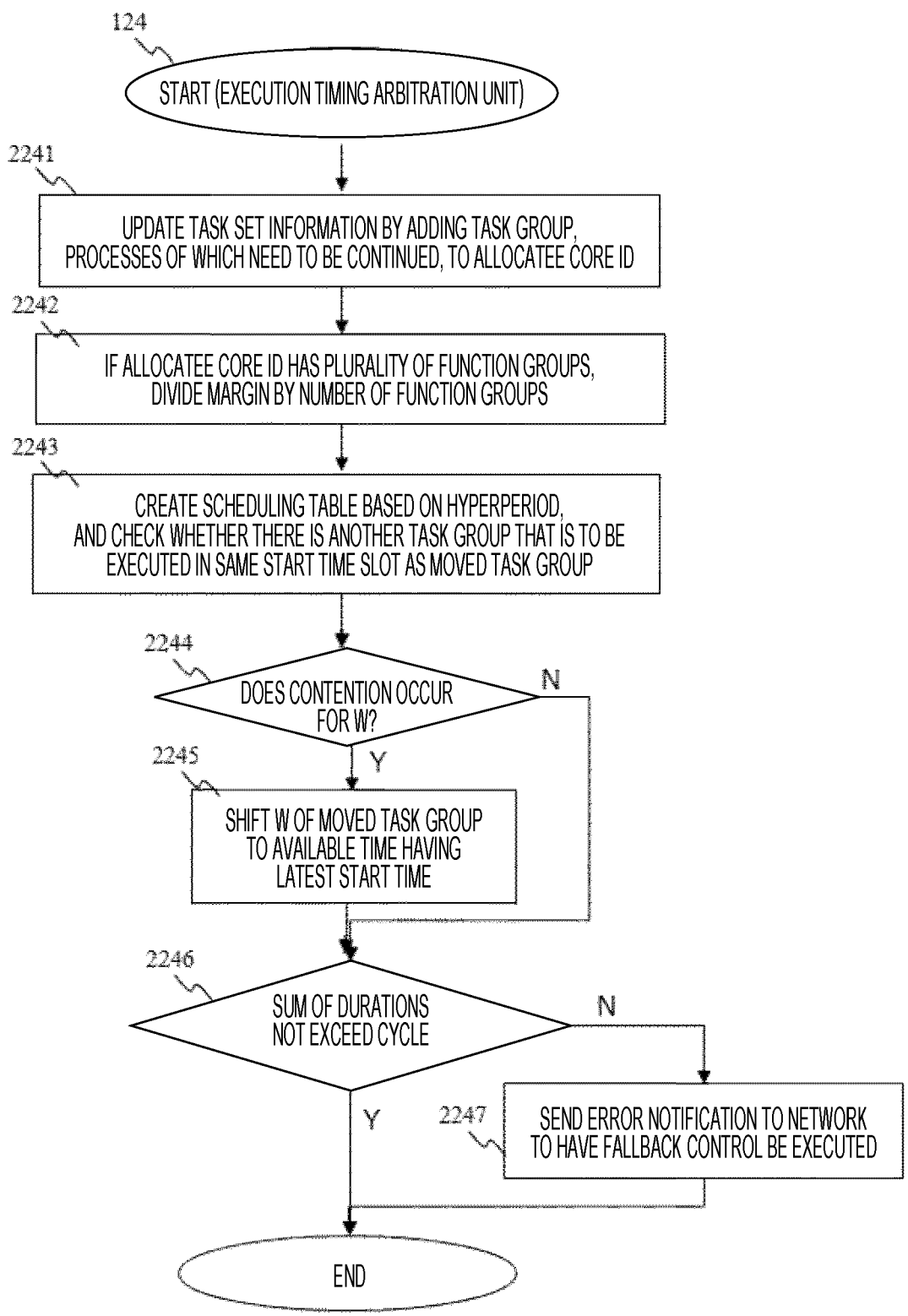
FIG. 12 is a flowchart of a process performed by an execution timing arbitration unit according to the second embodiment.

FIG. 12 is the sequence of a process performed by the execution timing arbitration unit 224 according to the second embodiment. Each of the steps included in FIG. 12 will be explained below.

(FIG. 12: Step 2241)

The execution timing arbitration unit 124 updates the task set information by adding the task group the processes of which need to be continued, to the allocatee core ID, to create the task set information 232 (FIG. 10B).

(FIG. 12: Step 2242)

If a single core ID has a plurality of function groups, the execution timing arbitration unit 124 divides the margin by the number of the function groups (FIG. 10B).

(FIG. 12: Step 2243)

The execution timing arbitration unit 124 then creates the scheduling table (FIG. 11A) based on a hyperperiod, and checks whether there is another task group that is to be executed at the same start time slot as the task group the processes of which need to be continued.

(FIG. 12: Step 2244)

If there are some tasks to be executed in the same time slot, the execution timing arbitration unit 124 determines whether the contention occurs for W of the task group the processes of which need to be continued. If true, the process is shifted to step 2245. If false, the process is shifted to step 2246.

(FIG. 12: Step 2445)

The execution timing arbitration unit 124 shifts W of the task group the processes of which need to be continued, to an available time having the latest start time. In order to maintain the order of executions within the task group, W is executed later in time than E. E may be separated in time from W. E may end up being later than the time predicted, but this difference is absorbed by the margin. By making the execution timings of E and W discontinuous, and by keeping E and W separate, as currently is, the timing at which W is executed is fixed. Therefore, any change is not required in other task groups, and the real-timeness can be ensured. In other words, a specific process of a task assigned with a high priority is always executed in a specific time slot.

(FIG. 12: Step 2246)

The execution timing arbitration unit 124 determines whether the sum of the durations does not exceed the cycle. If the determination result is true, the sequence of this operation is ended. If the determination result is false, the process is shifted to step 2247.

(FIG. 12: Step 2247)

The execution timing arbitration unit 124 sends error information to the network via the error notification unit 126, to cause the fallback control unit 125 to execute the fallback control, and this sequence of the operation is ended.

According to the second embodiment, the following effects can be achieved, in addition to the effects achieved by the first embodiment.

According to the second embodiment, in the vehicle control device implemented by the priority scheduling, even if a contention newly occurs in the execution timings because of the task group the processes of which need to be continued, only W of the task group is shifted, so that the real-timeness can be ensured as long as the schedulability is ensured.

According to the second embodiment, schedulability for ensuring that the CPU does not exceed 100% is verified by determining whether the sum of the durations does not exceed the cycle, but the present invention is not limited thereto. For example, when the task group spans across a plurality of cycles, schedulability is verified based on a hyperperiod.

According to the second embodiment, the same priorities are assigned to R and E of the same task group, and durations of R and E are plotted in this order. Therefore, even if a contention occurs, the arbitration is performed based on the priority scheduling, so that the process of the execution timing arbitration unit can be simplified.

Third Embodiment

The third embodiment is an example in which the task group the processes of which need to be continued belong to the same function group as that of the allocatee. Because any scheduling scheme may be used, the third embodiment will be explained using an example of priority scheduling. Therefore, only the differences from the second embodiment will be explained.

FIGS. 13A, 13B, and 13C illustrate task set information 331, 332, and 333 according to the third embodiment. The task set information includes core ID, task group, task ID, property, cycle, priority, start time, duration, and margin, and all of these items are the same as those in the second embodiment.

FIG. 14 illustrates a process continuity determination table 334 according to the third embodiment. The process continuity determination table 334 includes function group, task group, task ID, process continuity, ASIL, and required CPU utilization rate, and all of these items are the same as those in the second embodiment. The difference from the second embodiment is that a task group 2 belongs to a function group 1 that is the same function group to which a task group 1 belongs.

FIG. 15 illustrates core allocation information 335 according to the third embodiment. The core allocation information 335 includes core ID, ASIL, execution function group, CPU utilization rate, margin, and CPU availability rate, and all of these items are the same as those in the second embodiment. The third embodiment is different from the second embodiment in that the execution function groups 1 and 2 are to be executed by the core ID2.

FIGS. 16A and 16B illustrate scheduling tables 336 and 337 according to the third embodiment. The scheduling tables 336 and 337 include task group and start time, and the task group and the start time indicate the same thing as those in the second embodiment. The third embodiment is different from the second embodiment in that the different task group IDs are assigned for the third embodiment.

Figure 17:
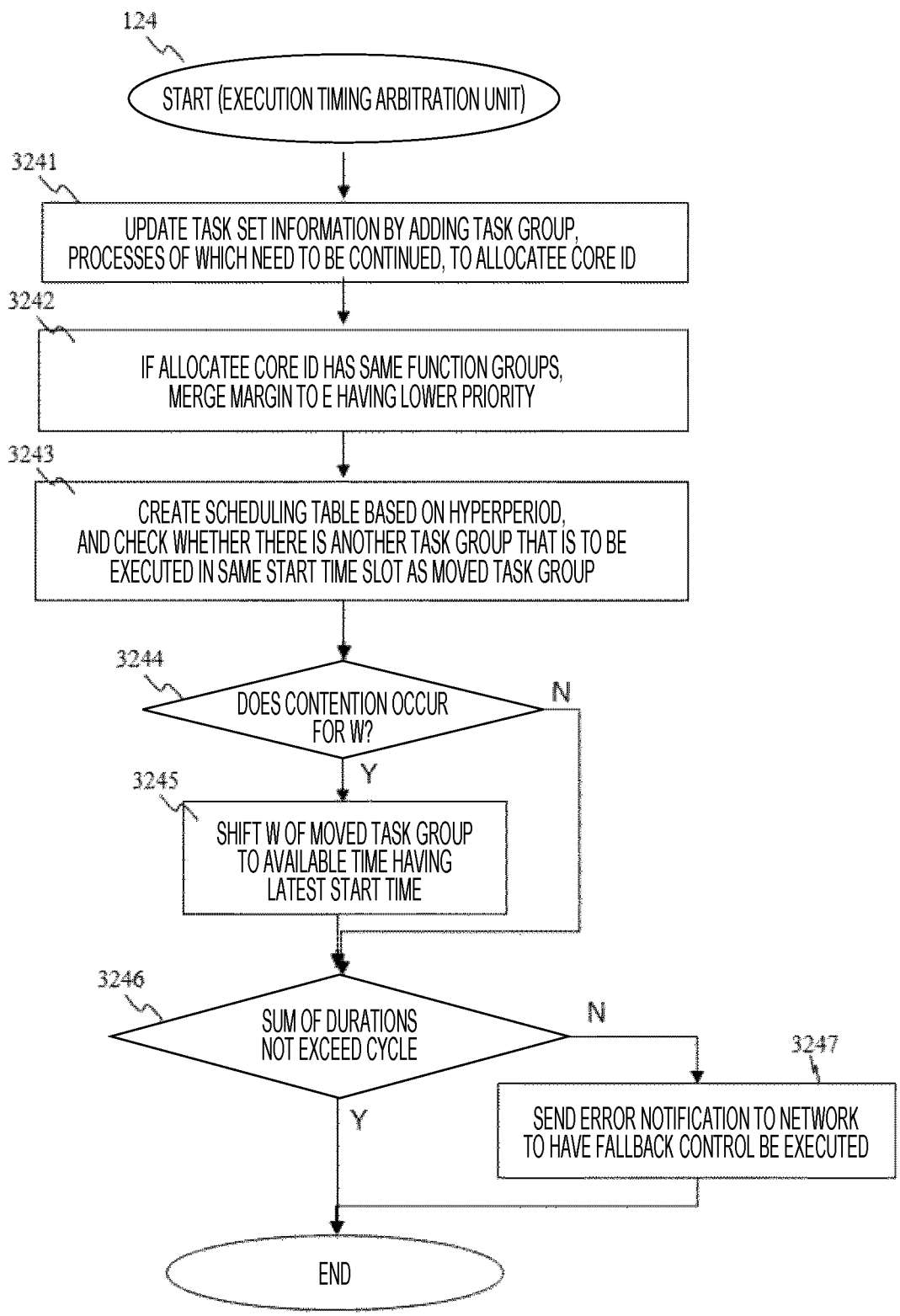
FIG. 17 is a flowchart of a process performed by an execution timing arbitration unit according to the third embodiment.

FIG. 17 is the sequence of a process performed by the execution timing arbitration unit 124 according to the third embodiment. Each of the steps included in FIG. 17 will be described below.

(FIG. 17: Step 3241)

The execution timing arbitration unit 124 updates the task set information by adding the task group the processes of which need to be continued, to the allocatee core ID, to create the task set information 332 (FIG. 13B).

(FIG. 17: Step 3242)

If the core ID has the same function groups with some margins, the execution timing arbitration unit 124 merges the margin to E (specific task) the priority of which is lower (FIG. 13B).

(FIG. 17: Step 3243)

The execution timing arbitration unit 124 then creates the scheduling table (FIG. 16A) based on a hyperperiod, and checks whether there is another task group that is to be executed at the same start time slot as the task group the processes of which need to be continued.

(FIG. 17: Step 3244)

If there are some tasks to be executed in the same time slot, the execution timing arbitration unit 124 determines whether the contention occurs for W of the task group the processes of which need to be continued. If true, the process is shifted to step 3245. If false, the process is shifted to step 3246.

(FIG. 17: Step 3445)

The execution timing arbitration unit 124 shifts W of the task group the processes of which need to be continued, to an available time having the latest start time. In order to maintain the order of executions within the task group, W is executed later in time than E. E may be separated in time from W. E may end up being later than the time predicted, but this difference is absorbed by the margin. By keeping E and W separate, as currently is, the timing at which W is executed is fixed. Therefore, any change is not required in the other task groups, and the real-timeness can be ensured.

(FIG. 17: Step 3246)

The execution timing arbitration unit 124 determines whether the sum of the durations does not exceed the cycle. If the determination result is true, the sequence of this operation is ended. If the determination result is false, the process is shifted to step 3247.

(FIG. 17: Step 3247)

The execution timing arbitration unit 124 sends an error information to the network via the error notification unit 126, to cause the fallback control unit 125 to execute the fallback control, and the sequence of the operation is ended.

According to the third embodiment, the effects described below can be achieved, in addition to the effects achieved by the second embodiment.

According to the third embodiment, when the task groups belonging to the same function group are executed on the same core, the margins can be integrated. Therefore, when the duration becomes longer than anticipated, the difference can be absorbed in the same manner, even when the overall margins are small. Therefore, the task groups can be implemented efficiently.

Fourth Embodiment

A fourth embodiment is an example in which task set information is created in advance to prepare for failures of the respective cores, before any of the cores actually fails. Only the differences from the first embodiment will be explained.

Figure 18:
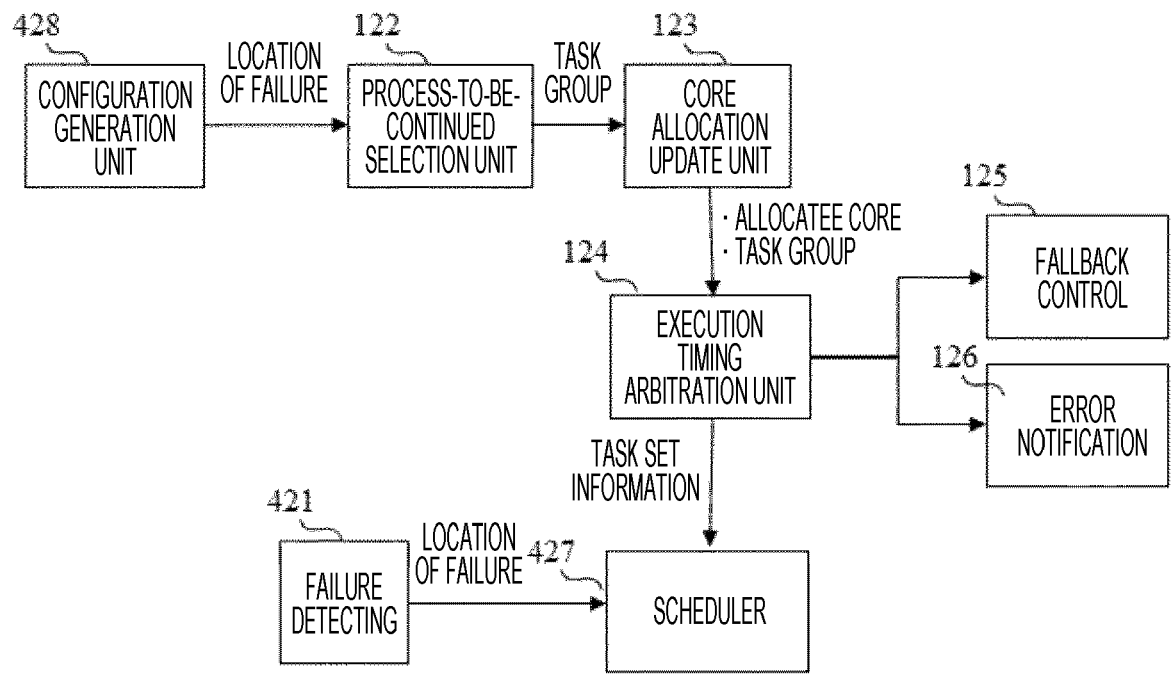
FIG. 18 is a functional block diagram of a control system according to the fourth embodiment.

FIG. 18 is a functional block diagram of an ECU 1 according to the fourth embodiment. A configuration generation unit 428 in the ECU 1 assumes a failure of each of the cores in advance, before the core actually fails, and outputs the location of failure that is where the core fails, to the process-to-be-continued selection unit 122. The core allocation update unit 123 then updates the core allocation, and the execution timing arbitration unit 124 generates task set information 133 corresponding thereto. The generated task set information 133 is then stored in the scheduler 427. When the failure is then detected, the failure detecting unit 421 notifies the scheduler 427 of the location of failure (core ID), and the scheduler 427 selects the task set information 133 based on the core ID.

According to the fourth embodiment, the effects described below can be achieved, in addition to the effects achieved by the first embodiment.

According to the fourth embodiment, the task set information that is to be used at the time of a failure can be prepared in advance, for each of the cores 10, before the failure actually occurs. Therefore, it is possible to shorten the time required for a specific core 10 to execute the task the process of which needs to be continued, from when the failure occurs.

Fifth Embodiment

A fifth embodiment is an example in which, when the core 10 fails, a core 10 of another ECU executes a task the process of which needs to be continued. Only the differences from the first embodiment will be explained.

Figure 19:
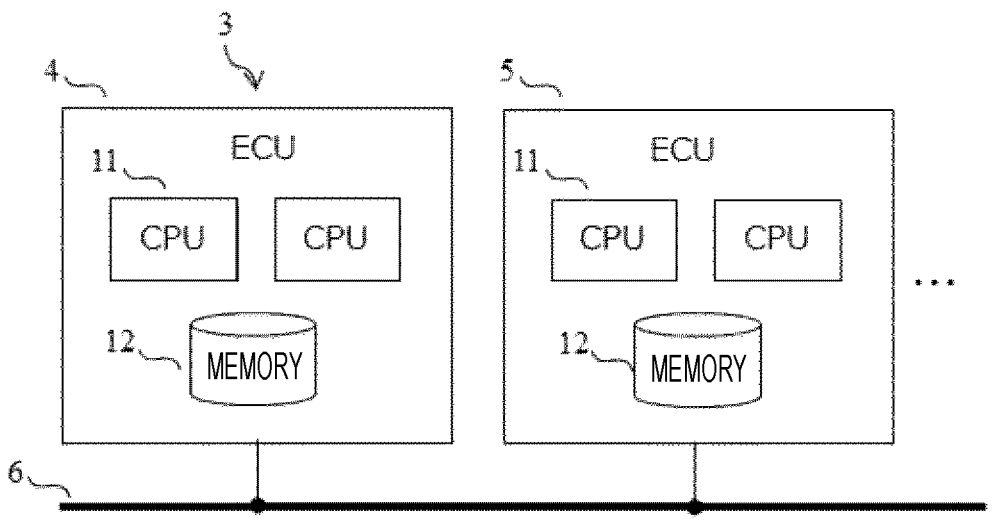
FIG. 19 is a configuration diagram of a system according to a fifth embodiment.

FIG. 19 illustrates a configuration diagram of a system according to the fifth embodiment of the present invention. This vehicle control device 3 includes an ECU 4, an ECU 5, and a network 6. Each of the ECU 4 and the ECU 5 includes a plurality of CPUs 11 and a memory 12, and the internal configurations of the ECUs 4 and 5 are basically the same as that according to the first embodiment, except that the number of CPUs 11 is different.

Figures 20, 21A:
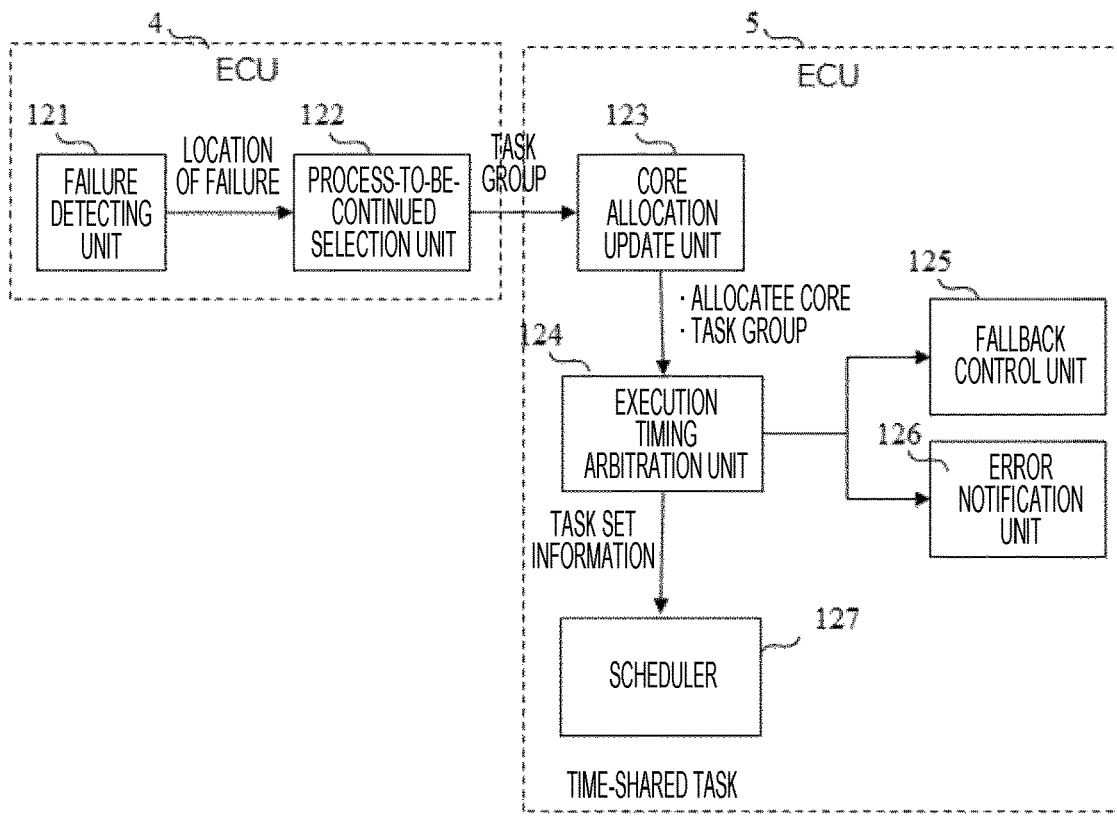
FIG. 20 is a functional block diagram of a control system according to the fifth embodiment.
FIG. 21A is a diagram illustrating task set information according to the fifth embodiment.

FIG. 20 is a functional block diagram of the ECUs 4 and 5 according to the fifth embodiment. The ECU 4 includes the failure detecting unit 121 and the process-to-be-continued selection unit 122 that are described in the first embodiment. The task group information output from the process-to-be-continued selection unit 122 is transmitted to the ECU 5 via the network 6, and is input to the core allocation update unit 123. The ECU 5 includes the core allocation update unit 123, the execution timing arbitration unit 124, the fallback control unit 125, the error notification unit 126, and the scheduler 127.

FIGS. 21A, 21B, and 21C illustrate task set information 531, 532, and 533 according to the fifth embodiment. The task set information includes ECUID, core ID, task group, task ID, property, cycle, priority, start time, duration, and margin. The fifth embodiment is different from the other embodiments in that ECUID is added, because the plurality of ECUs 4 and 5 fall within the scope.

FIG. 22 illustrates a process continuity determination table 534 according to the fifth embodiment. The process continuity determination table 534 includes function group, task group, task ID, process continuity, ASIL, and required CPU utilization rate, and all items are the same as those in the second embodiment. A difference from other embodiments is that a function group 3 is added.

FIG. 23 illustrates core allocation information 535 according to the fifth embodiment. The core allocation information 535 includes ECUID, core ID, ASIL, execution function group, CPU availability rate, margin, and CPU utilization rate. The fifth embodiment is different from the other embodiments in that ECUID is added, because the plurality of ECUs 4 and 5 fall within the scope.

FIGS. 24A and 24B illustrate scheduling tables 536 and 537 according to the fifth embodiment. The scheduling tables 536 and 537 include task group and start time, and the task group and the start time indicate the same thing as those in the other embodiments. The fifth embodiment is different from the other embodiments in that the different task group IDs are assigned for the fifth embodiment.

According to the fifth embodiment, the following effects can be achieved, in addition to the effects achieved by the first embodiment.

According to the fifth embodiment, when it is not possible to execute a task group the process of which needs to be continued in the same ECU after a core fails, another ECU can execute the task group, so that availability can be improved.

REFERENCE SIGNS LIST 0, 3 vehicle control device
1, 4, 5 ECU
2, 6 network
10 core
11 CPU
12 memory
121 failure detecting unit
122 process-to-be-continued selection unit
123 core allocation update unit
124 execution timing arbitration unit
125 fallback control unit 126 error notification unit
127 scheduler
136, 137, 236, 237, 336, 337, 536, 537 scheduling table

The invention claimed is:

1. A vehicle control device including a CPU that executes a plurality of tasks in clock-synchronization, the vehicle control device comprising a controller configured to:
detect a failure of a core in the CPU;
allocate a task having been executed by the core having failed, to a non-failed core;
verify whether the non-failed core can execute the task at a time assigned to the failed core; wherein
when another task is scheduled to be executed at the same time on the non-failed core, change an execution time of the task that was being executed by the failed core, and set a time at which the plurality of tasks can be executed.

2. The vehicle control device according to claim 1, wherein
a determination as to whether to continue an execution of the task having been executed by the core having failed is made based on an automobile safety level.

3. The vehicle control device according to claim 1, wherein
when a vehicle function group of the task of the failed core belongs to a vehicle function group to which the task of the non-failed core belongs, the controller is further configured to merge a margin that is a time margin given to a duration of the task, to a specific one of the tasks.

4. The vehicle control device according to claim 1, wherein
a vehicle function group includes a task group including one or more of the tasks, the task group includes an input processing task, a control processing task, and an output processing task, the control processing task is executed after the input processing task and before the output processing task, and at least the output processing task is executed by time-sharing.

5. The vehicle control device according to claim 4, wherein the controller is further configured to:
assign respective priorities to the plurality of tasks, and a task given a high priority executes a specific process in a specific time slot.

6. The vehicle control device according to claim 4, wherein
the controller is further configured to shift execution time slots for the task group while maintaining an order at which the input processing task, the control processing task, and the output processing task are executed.

7. The vehicle control device according to claim 4, wherein
the controller is further configured to determine whether the input processing task and the control processing task are movable before the output processing task is executed, within a same cycle, and makes a notification of fallback control or a notification of an error when the input processing task and the control processing task are not movable.

8. The vehicle control device according to claim 1, wherein the controller is further configured to control the plurality of tasks executed in clock-synchronization and execute a specific process at a specific time slot.

9. The vehicle control device according to claim 1, wherein
a vehicle function group includes a task group including one or more of the tasks, and when task groups belonging to a plurality of function groups are on a same core, a margin that is a time margin given to a duration of the task is divided by number of the function groups.

10. The vehicle control device according to claim 1, wherein
a vehicle function group includes a task group including one or more of the tasks,
the task group includes an input processing task, a control processing task, and an output processing task, and
execution timings of the control processing task and the output processing task are discontinuous.

11. The vehicle control device according to claim 1, wherein
a vehicle function group includes a task group including one or more of the tasks, and
the controller is further configured to identify a task group processes of which need to be continued, among task groups having been executed by the failed core.

12. A vehicle control device including a CPU that executes a plurality of tasks in clock-synchronization, the vehicle control device comprising a controller configured to:
detect a failure of a core in the CPU; and
allocate a task having been executed by the core having failed, to a non-failed core; wherein
when the task having been executed by the core having failed is allocated to the non-failed core, the controller is configured to shift an execution time slot so as to make the task being executed by the non-failed core executable, thereby setting time slots in which the plurality of tasks are executable;
the core includes a plurality of cores, the controller is configured to assume a failure of each of the plurality of cores before a failure actually occurs and output a location of failure, among the plurality of cores, and store therein task set information corresponding to the location of failure, among the plurality of cores, the location of failure being generated by the controller; and
when the controller detects a failure of the core, the controller is configured to select the task set information corresponding to the core having failed, from the task set information stored in the controller.

* * * * *